United States Patent
Schneider et al.

[11] Patent Number: 5,387,408
[45] Date of Patent: Feb. 7, 1995

[54] COPPER OXIDE-ALUMINUM OXIDE-MAGNESIUM OXIDE CATALYSTS FOR CONVERSION OF CARBON MONOXIDE

[75] Inventors: Michael Schneider, Ottobrunn; Karl Kochloefl, Bruckmühl/Heufeld; Gerd Maletz, Bruckmühl, all of Germany

[73] Assignee: Sud-Chemie A.G., Munich, Germany

[21] Appl. No.: 992,496

[22] Filed: Dec. 17, 1992

[30] Foreign Application Priority Data

Dec. 23, 1991 [DE] Germany ............... 4142900

[51] Int. Cl.$^6$ ............................................... C01B 3/16
[52] U.S. Cl. ........................................ 423/656; 502/341
[58] Field of Search ........................ 423/656; 502/341

[56] References Cited

U.S. PATENT DOCUMENTS

| | | | |
|---|---|---|---|
| 1,889,672 | 11/1932 | Larson | 423/656 |
| 3,787,332 | 1/1974 | Sugier | 252/443 |
| 3,899,577 | 8/1975 | Sugier | 423/656 |
| 4,451,683 | 5/1984 | Davies et al. | 502/341 |
| 4,522,937 | 6/1985 | Yoo et al. | 502/341 |
| 4,728,635 | 3/1988 | Bhattacharyya et al. | 502/341 |
| 5,008,235 | 4/1991 | Wegman et al. | 502/342 |

FOREIGN PATENT DOCUMENTS

| | | |
|---|---|---|
| 810258 | 6/1983 | U.S.S.R. |
| 1232278 | 7/1989 | U.S.S.R. |

*Primary Examiner*—Wayne Langel
*Attorney, Agent, or Firm*—Scott R. Cox

[57] ABSTRACT

A catalyst for the conversion of carbon monoxide which before reductive activation, has the chemical composition which corresponds to the formula $$Cu_{0.04-6}AlMg_{0.1-10}O_x,$$

wherein x denotes the number of oxygen atoms required to maintain electroneutrality per formula unit; and wherein the intensity ratio between the x-ray diffraction lines of the spinels $CuAl_2O_4$ and $MgAl_2O_4$ at d=0.244 nm and copper oxide at d=0.232 nm, determined as the ratio of reflex heights is about 0.05 to 0.5.

4 Claims, No Drawings

COPPER OXIDE-ALUMINUM OXIDE-MAGNESIUM OXIDE CATALYSTS FOR CONVERSION OF CARBON MONOXIDE

BACKGROUND OF THE INVENTION

This invention is directed to catalysts useful in the conversion of carbon monoxide.

Synthesis gas represents one of the most important feedstocks of industrial chemistry. It is used to synthesize basic chemicals, such as methanol or oxyaldehydes, as well as in production of pure hydrogen.

Synthesis gas produced by steam reforming of hydrocarbons generally does not meet the requirements for further use with respect to $CO/H_2$ ratio. It is therefore industrial practice to reduce the CO content by conversion with steam.

The conversion of carbon monoxide with steam.

$$CO + H_2O \rightleftharpoons H_2 + CO_2$$

is favored by lower temperatures and the reaction is slightly exothermic.

While lower temperatures favor more complete carbon monoxide conversion, higher temperatures allow recovery of the heat of reaction at a sufficient temperature level to generate pressure steam. For maximum efficiency and economy of operation, many plants contain a high temperature reaction unit for bulk carbon monoxide conversion and heat recovery, and a low temperature reaction unit for final carbon monoxide conversion.

Chromium-promoted iron catalysts are normally used in the first stage at temperatures above about 350° C. to reduce the CO content to about 3-4% (cf., for example, D. S. Newsom, Catal. Rev., 21 (1980), 275). As is known from the literature (cf., for example, H. Topsoe and M. Boudart, J. Catal., 31 (1973), 346), the chromium oxide promoter combines two functions. In the first place, it serves to enhance catalytic activity and in the second place acts as a heat stabilizer, i.e., it increases the heat stability of magnetite, the active form of the catalyst, and prevents unduly rapid deactivation under conditions of technical use.

Unfortunately, when chromium is used, especially in hexavalent form, expenditures not to be underestimated must be incurred to guarantee work safety both during production and later handling of the catalyst, and a health hazard cannot be fully ruled out despite considerable effort. In addition, the spent catalyst ultimately poses a hazard to man and the environment and must be disposed of with allowance for the provisions in force for toxic waste.

Particularly, in the production of pure hydrogen, it is necessary to further reduce the CO content of synthesis gas. To this end, the product is fed to a second conversion stage at much lower temperature and thus more favorable equilibrium. Standard catalysts for this conversion stage are based on Cu—Zn oxide. This type of catalyst is indeed devoid of environmentally hazardous components, but is beset with the major drawback of extremely low heat stability so that its use is essentially limited to temperatures below about 250° C. EP B 0 296 734 describes catalysts for conversion of carbon monoxide based on copper oxide and zinc and/or magnesium compounds, optionally with addition of aluminum oxide and other oxides. In preparing the catalysts, the preliminary stages are heated to temperatures of at most 200° C. Under such conditions, spinel formation, which causes thermal stabilization of the active components, does not occur.

The objective of the present invention is to find a catalyst for a CO conversion process that, on the one hand, contains no components that are harmful to man or the environment and, on the other hand, possesses much higher heat stability than available conversion catalysts.

SUMMARY OF INVENTION

This invention is directed to copper oxide-aluminum oxide—magnesium oxide catalysts useful in the conversion of carbon monoxide.

The catalyst of this invention, before reductive activation, has a chemical composition which corresponds to the formula $$Cu_{0.04-6}Al\,Mg_{0.1-10}O_x$$

in which x denotes the number of oxygen atoms required to maintain electroneutrality per formula unit and wherein the intensity ratio between the x-ray diffraction lines of the spinels $CuAl_2O_4$ and $MgAl_2O_4$ at $d = 0.244$ nm and copper oxide at $d = 0.232$ nm, defined as the ratio of reflex heights, ranges from about 0.05 to about 0.5.

The catalyst of this invention is preferably used in a process in which carbon monoxide and water are converted to carbon dioxide and hydrogen at temperatures in the range between 150° and 450° C.

DESCRIPTION OF THE INVENTION

The catalysts of this invention can be made by any of the known methods that guarantee sufficiently intense blending of the components for catalytic use. For example the corresponding oxides, i.e. , copper oxide, aluminum oxide and magnesium oxide, can be ground together in finely distributed form. It is preferable, however, to obtain the oxide form by heat treatment of intermediate stages which are convertible to oxides. Such heat treatment is conducted at a temperature of at least about 450° C. and preferably about 550° to about 650° C. The intermediate stages are obtained by simultaneous or consecutive precipitation of the catalyst components. These intermediate stages are then converted to the oxide form by heat treatment and are then reduced. During heat treatment, the spinels $CuAl_2O_4$ and $MgAl_2O_4$ are partly formed from the oxides. Available results indicate that a balanced ratio between unconverted copper oxide and spinel appears to be important for adequate heat stability.

The precipitation reaction is the preferred preparation method wherein suitable intermediate stages are separated from a solution of their salts in the form of an insoluble precipitate for thermal conversion to the oxide. All soluble salts, e.g., halides, sulfates, or nitrates, are suitable as raw materials. Alkali carbonates and, ammonium (bi)carbonate are preferred for use as precipitants. The catalyst intermediate stages are preferably in the hydroxide, hydroxycarbonate, or carbonate form before conversion to the oxide.

A particularly preferred embodiment prescribes the separate precipitation of a magnesium hydroxide precipitate with example, ammonia, which is then mixed with copper and aluminum—containing intermediate stages, followed by heat treatment and reduction.

Heat treatment or calcining can be conducted under conditions, for example, in a tray furnace, or under dynamic conditions, such as in a rotary kiln. The temperatures and residence times are determined for each individual case. The criterion for selecting the calcining parameters is the intensity ratio between the x-ray diffraction lines of the spinels, $CuAl_2O_4$ and $MgAl_2O_4$ at $d=0.244$ nm and copper oxide at $d=0.232$ nm, which range from about 0.05 to about 0.5. The lowest calcining temperature is 450° C.

The chemical composition of the catalysts of this before reductive activation, corresponds to the formula $$Cu_{0.04-6}Al\ Mg_{0.1-10}O_x$$

wherein x denotes the number of oxygen atoms required to maintain electroneutrality per formula unit. The preferred chemical composition corresponds to the formula $$Cu_{0.1-2}AlMg_{0.3-3}O_x$$

The BET surface of the oxide catalyst is at least about 50 m²/g, and, preferably, at least about 80m²/g. The BET surface is determined by $N_2$ adsorption according to the single—point method, as described in DIN 66 132.

The specific pore volume of the oxide catalyst determined by Hg porosimetry is at least about 0.3 cm²/g, preferably at least about. 0.4 cm³/g.

The specific pore volume is determined according to the mercury penetration method described in J. Van Brakel et al., Powder Technology, 29 (1981), 1. In this method, mercury is pressed at a pressure of about 2000 bar into the catalyst moldings, during which the volume reduction of the mercury is plotted as a function of pressure A curve is obtained from which the pore distribution can also be determined. According to this mercury penetration method, only the volume and distribution of pores with a diameter of >7.5 nm can be determined.

Known methods can be used to form the catalyst mass off this invention. Preferred forming methods are pelletizing and extrusion, in which the use of inorganic or organic auxiliaries as lubricants or to improve plasticity during extrusion is recommended. Forming can also be undertaken both before and after calcining.

The catalysts of this invention preferably occur as moldings, especially in the form of spheres, pellets, rings or extruded products, in which the latter are formed mostly as solid or hollow objects in order to achieve high geometric surface with a simultaneously low resistance to flow. Honeycombs are particularly preferred shapes.

The catalyst of this invention is preferably employed in a process in which carbon monoxide and water are converted in the temperature range between about 150° and about 450° C., preferably in the temperature range between about 250° and about 400° C., to carbon dioxide and hydrogen.

The following examples describe production and use of the catalyst employed according to the invention:

EXAMPLE 1

3750 g of $Al(NO_3)_3 9H_2O$ and 1812 g of $Cu(NO_3)_2 3H_2O$ are dissolved in desalinized water to a total volume of 10 L and the solution is heated to 50° C. (solution I). A 1.5M soda solution is then produced and heated to 50° C. (solution II). Both solutions are fed by hose pumps during mixing into a thermostatted precipitation vessel. The metering rate of solution I is 167 mL/min. Solution II is metered so that the pH in the precipitation vessel stays at 6+0.2. The temperature is set at 50° C. The precipitate is filtered and washed until the sodium content is 500 ppm referred to loss on ignition at 600° C.

1280 g of $Mg(NO_3)_2 6H_2O$ is dissolved to 10 L total volume. The contained magnesium is almost quantitatively precipitated by addition of concentrated ammonia. This is washed twice with 10 L of $H_2O$ each time.

The two filter cakes are vigorously mixed in an Eirich mixer, the mixture is then dried at 120° C. overnight and calcined as follows:

It is heated at 2° C./min to 60° and held for 4 hours at this temperature. The calcined catalyst mass is sieved-granulated at a mesh width of 1 mm and pressed into cylindrical pellets (diameter 4.5 mm, height 4.5 mm) with addition of 2% synthetic graphite at an average lateral crush strength of 80N. The copper content is 39.5%, the BET surface is 119 m²/g and the pore volume 0.60 cm³/g. The intensity ratio between the x-ray diffraction lines of spinels $CuAl_2O_4$ and $MgAl_2O_4$ at $d=0.244$ nm and copper oxide at $d=0.232$ nm is 0.25.

EXAMPLE A

Comparative Example

The preparation i s run as described in Example 1, but calcining is carried out at 800° C.

The x-ray diffraction pattern shows an intensity ratio between the reflexes of spinels $CuAl_2O_4$ and $MgAl_2O_4$ at $d=0.244$ nm and copper oxide at $d=0.232$ nm, determined as the ratio of reflex heights, of 0.63. The catalyst therefore is not within the scope of the invention. The BET surface is 40 m2/g and the pore volume 0.34 cm³/g.

EXAMPLE B

Comparative Example

The preparation is run as described in Example 1, but calcining is carried out at 400° C. No spinel is observed.

EXAMPLE C

Comparative Example 3670 g of $Al(NO_3)_3.9H_2O$, as well as 2416 g of $Cu(NO_3)_2.3H_2O$, are dissolved to a total volume of 10 L and precipitation with a 1.5M soda solution at 50° C. and pH 6±0.2 is carried out as described in Example 1. The filter cake is washed and, unlike Example 1, dried without including a magnesium hydroxide intermediate stage, and calcined at 600° C. The calcined catalyst mass is also pelletized as described in Example 1. The copper content is 52%, the BET surface 63 m2/g and the pore volume 0.63 cm3/g. Since the catalyst contains no magnesium, an example according to the invention is not involved here.

The effectiveness of each catalyst with respect to conversion of carbon monoxide with steam was demonstrated by feeding a gas mixture consisting of 12% CO, 10% $CO_2$ and 78% $H_2$ after introduction of steam in a volume ratio steam/gas 0.5. The catalyst was converted beforehand to active form by passing through a mixture hydrogen and steam at the reaction temperature. The reactor was operated under isothermal conditions in which one layer (5 mL) of catalyst and one of inert material ($\alpha$-Al$_2$O$_3$) of the same pellet size were arranged in alternation.

The CO concentration in the gas mixture was analyzed before and after passing through the catalyst packing by gas chromatography. The following relations are used for evaluation:

$$X_{ex} = C^E - C^A/C^E$$

$$ETA-CO = X_{ex}/X_{th}$$

in which:

$X_{ex}$ is the experimentally determined CO conversion
$X_{th}$ is the equilibrium conversion at the corresponding reaction temperature
$C^E$ is the initial concentration of CO
$C^A$ is the volume-corrected exit CO concentration
ETA-CO is the CO conversion normalized to equilibrium conversion at the corresponding temperature.

The following reaction conditions were set:

| Total pressure | 20 bar |
|---|---|
| Temperature | 270° C./310° C. |
| Space velocity | 20,000 L/L h |

Upon completion of this first test cycle the temperature of the reactor was raised to 400° C. and the catalysts were aged for 15 hours at this temperature. A second measurement cycle was then run under conditions corresponding to the first cycle.

Table I summarized the test results.

TABLE I

| | | Test results. | |
|---|---|---|---|
| Catalyst | T(°C.) | First cycle ETA-CO | Second cycle ETA-CO |
| Example 1 | 270 | 0.86 | 0.86 |
| | 310 | 0.95 | 0.94 |
| Example A | 270 | 0.81 | 0.74 |
| (Comparison) | 310 | 0.91 | 0.86 |
| Example B | 270 | 0.89 | 0.83 |
| (Comparison) | 310 | 0.95 | 0.91 |
| Example C | 270 | 0.87 | 0.78 |
| (Comparison) | 310 | 0.95 | 0.86 |

It is apparent that only the catalyst of invention according to Example 1 combines high initial activity with high heat stability. This catalyst is magnesium-promoted, calcined at a temperature above 450° C. and exhibits an intensity ration between the x-ray diffraction lines of spinels CuAl$_2$O$_4$ and MgAl$_2$O$_4$ at d=0.244 nm and copper oxide at d=0.232 nm of 0.25. The ETA-CO value remains almost unchanged after aging.

The catalyst according to Example A has an intensity ratio between the x-ray diffraction lines of spinels CuAl$_2$O$_4$ and MgAl$_2$O$_4$ at d=0.244 nm and copper oxide at d=0.232 of 0.63 and therefore does not lie within the scope of the invention. Although it has the same composition as the catalyst of Example 1, its activity clearly diminishes in the second cycle.

The catalyst according to Comparison Example B has the same chemical composition as the catalyst of the invention (Example 1) but was calcined at a lower temperature, namely 400° C. It is evident that calcining at this low temperature is not sufficient to obtain stability for extended operation. The activity of this catalyst is equal to that of the catalyst of the invention at high reaction temperature and even surpasses this at lower reaction temperature. However, after heat aging its activity is substantially reduced.

In the case of the catalyst according to Example C, the intensity ratio of the cited x-ray diffraction lines lies in the range according to the invention, but the catalyst is not magnesium-promoted and therefore is not an object of the present invention. Although its content of active component (copper) is much higher than the content of the catalyst of the invention according to Example 1, its initial activity is not higher than that of the catalyst of the invention and it is also significantly deactivated, just as the comparative catalysts of Examples A and B.

What is claimed is:

1. A process for converting carbon monoxide and water to carbon dioxide and hydrogen at a temperature in the range of about 150° to about 450° C. using a catalyst which, before reductive activation, is comprised of a chemical composition corresponding to the formula

wherein x denotes the number of oxygen atoms required to maintain electroneutrality per formula unit, and wherein the intensity ratio between the x-ray diffraction lines of the spinels CuAl$_2$O$_4$ and MgAl$_2$O$_4$ at d=0.244 nm and copper oxide at d=0.232 nm, defined as the ratio of reflex height, ranges from about 0.05 to about 0.5.

2. The process of claim 1 wherein the temperature is in the range of about 250° C. to about 400° C.

3. A process for converting carbon monoxide and water to carbon dioxide and hydrogen at a temperature in the range of about 150° to about 450° C. using a catalyst comprised of a chemical composition corresponding to the formula

wherein x denotes the number of oxygen atoms required to maintain electroneutrality per formula unit, and wherein the intensity ratio between the x-ray diffraction lines of the spinels CuAl$_2$O$_4$ and MgAl$_2$O$_4$ at d=0.244 nm and copper oxide at d=0.232 nm, defined as the ratio of reflex heights, ranges from about 0.05 to about 0.5.

4. The process of claim 3 wherein the temperature is in the range of about 250° C. to about 400° C.

* * * * *